US012681776B2

(12) United States Patent
Agarwal

(10) Patent No.:  US 12,681,776 B2
(45) Date of Patent:     Jul. 14, 2026

(54) LOCK AND BUFFER SCHEDULING IN MULTI-CORE ARCHITECTURES

(71) Applicant: XILINX, INC., San Jose, CA (US)

(72) Inventor: Ajit Kumar Agarwal, Hyderabad (IN)

(73) Assignee: XILINX, INC., San Jose, CA (US)

( * ) Notice: Subject to any disclaimer, the term of this patent is extended or adjusted under 35 U.S.C. 154(b) by 715 days.

(21) Appl. No.: 17/871,705

(22) Filed: Jul. 22, 2022

(65) Prior Publication Data

US 2024/0028422 A1     Jan. 25, 2024

(51) Int. Cl.
| | |
|---|---|
| *G06F 9/50* | (2006.01) |
| *G06F 9/52* | (2006.01) |
| *G06F 9/54* | (2006.01) |

(52) U.S. Cl.
CPC ................ *G06F 9/52* (2013.01); *G06F 9/544* (2013.01); *G06F 9/545* (2013.01)

(58) Field of Classification Search
CPC . G06F 9/52; G06F 9/544; G06F 9/545; G06F 8/44; G06F 8/45; G06F 16/24568
USPC ........................................................ 718/104
See application file for complete search history.

(56) References Cited

U.S. PATENT DOCUMENTS

| | | | | |
|---|---|---|---|---|
| 11,036,546 | B1 * | 6/2021 | Bhandari ................ | G06F 9/544 |
| 11,080,111 | B1 * | 8/2021 | Perelygin ................ | G06F 9/544 |
| 11,138,019 | B1 | 10/2021 | Sastry et al. | |
| 12,159,214 | B1 * | 12/2024 | Ko ....................... | G06F 12/0802 |
| 2015/0262557 | A1 * | 9/2015 | Fritz ..................... | H04N 5/937 |
| | | | | 345/547 |
| 2020/0257652 | A1 * | 8/2020 | Wang ...................... | G06N 3/08 |
| 2020/0372200 | A1 * | 11/2020 | Sivaraman ............. | G06F 30/30 |
| 2023/0205585 | A1 * | 6/2023 | Chatterjee ............ | G06F 9/5016 |
| | | | | 718/104 |

* cited by examiner

*Primary Examiner* — Pierre Vital
*Assistant Examiner* — Abdou K Seye
(74) *Attorney, Agent, or Firm* — Patterson + Sheridan, LLP

(57) ABSTRACT

Application code is compiled to generate code to be executed by the cores of a multi-core architecture. Generating the code includes mapping kernels of the application onto the DPEs, and generating main code for cores of the DPEs. The main code is generated by initializing locks for each kernel associated with the cores the DPEs. The locks are associated with input ports and output ports of the kernels. Further, buffers are initialized for the kernels. The buffers are associated with the locks and data streams. Subsequent to initializing the locks and initializing the buffers, the kernels are executed to generate data samples from the data streams. Subsequent to executing the kernels, the locks are released for subsequent calls of the kernels.

18 Claims, 14 Drawing Sheets

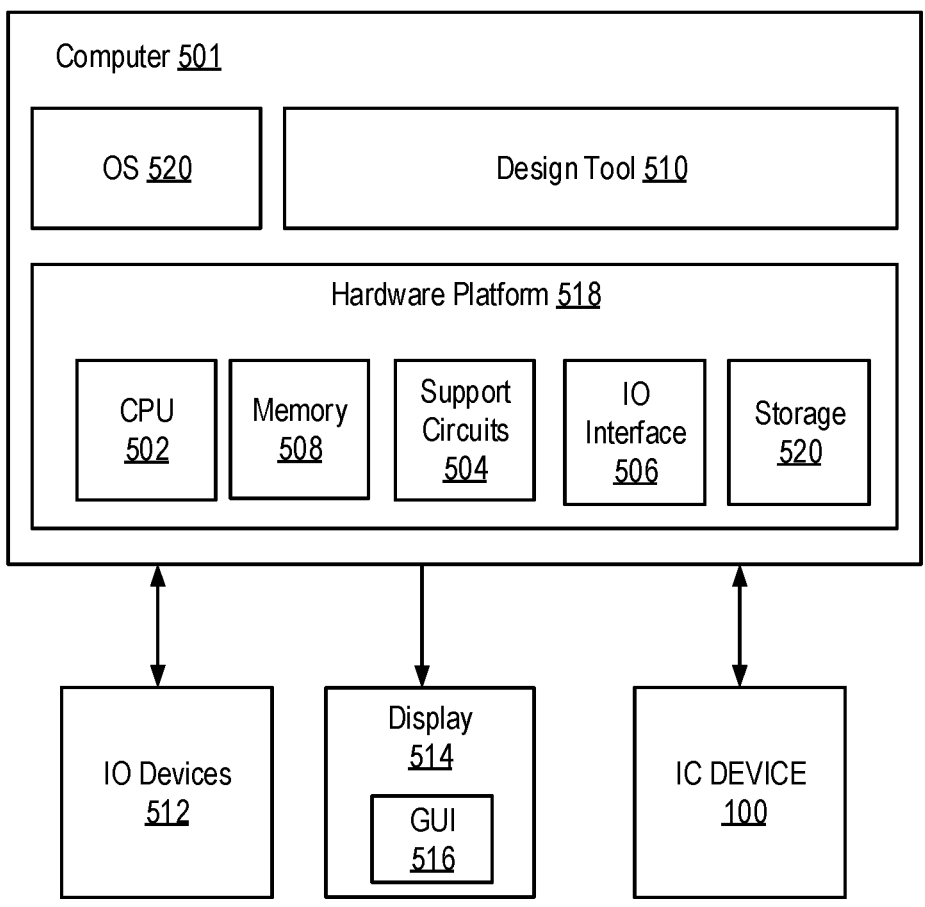
FIG. 5

608

1100

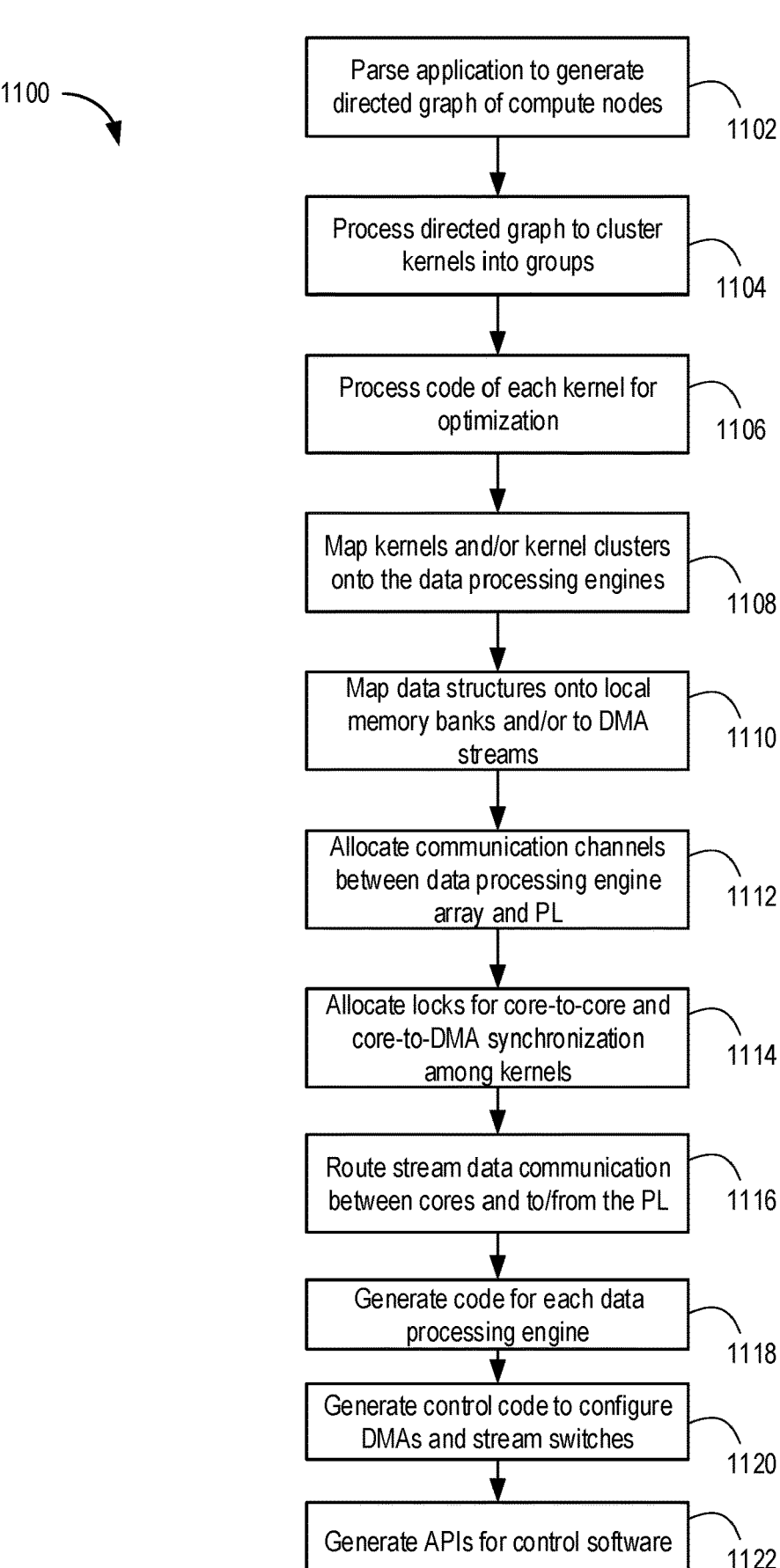

Parse application to generate directed graph of compute nodes
1102

Process directed graph to cluster kernels into groups
1104

Process code of each kernel for optimization
1106

Map kernels and/or kernel clusters onto the data processing engines
1108

Map data structures onto local memory banks and/or to DMA streams
1110

Allocate communication channels between data processing engine array and PL
1112

Allocate locks for core-to-core and core-to-DMA synchronization among kernels
1114

Route stream data communication between cores and to/from the PL
1116

Generate code for each data processing engine
1118

Generate control code to configure DMAs and stream switches
1120

Generate APIs for control software
1122

FIG. 11

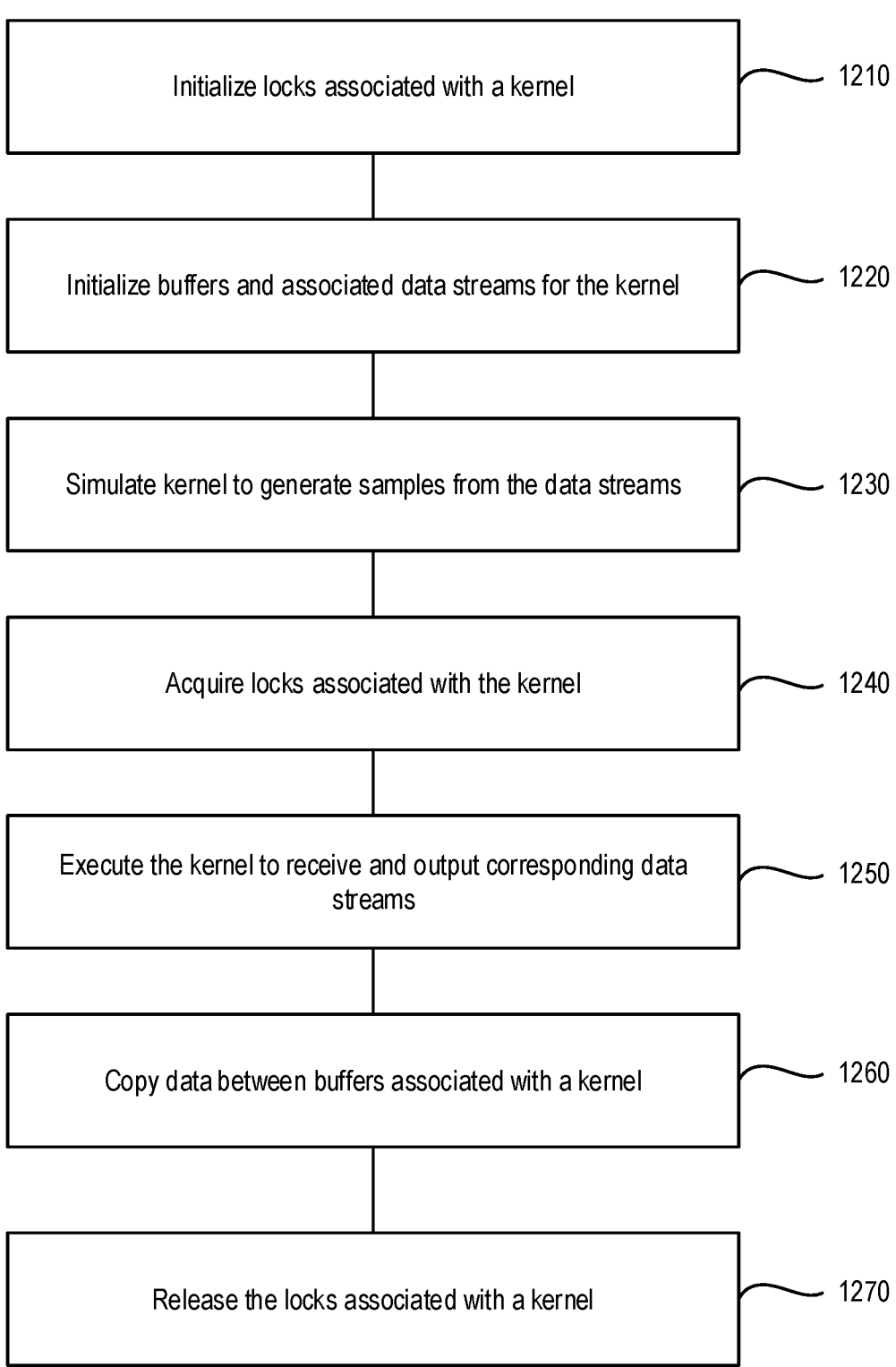

Initialize locks associated with a kernel — 1210

Initialize buffers and associated data streams for the kernel — 1220

Simulate kernel to generate samples from the data streams — 1230

Acquire locks associated with the kernel — 1240

Execute the kernel to receive and output corresponding data streams — 1250

Copy data between buffers associated with a kernel — 1260

Release the locks associated with a kernel — 1270

FIG. 12

LOCK AND BUFFER SCHEDULING IN MULTI-CORE ARCHITECTURES

TECHNICAL FIELD

Examples of the present disclosure generally relate to electronic circuit design and, in particular, to assigning locks and buffers to kernels of an electronic circuit design.

BACKGROUND

A processor, a system on a chip (SoC), and an application specific integrated circuit (ASIC) can include multiple cores for performing compute operations such as processing digital signals, performing cryptography, executing software applications, rendering graphics, and the like. The compilers for the multi-core architectures utilize locks to synchronize the reading and writing data within a core and/or between cores. Compilers assign locks to the input and/or output ports of kernels of an application via kernel calls. The kernels of an application are called and then the locks are initiated and assigned by an application.

In one or more examples, a non-transitory computer readable medium having stored thereon instructions that when executed by a processor cause the processor to map, based on graph representation of an application, kernels of the application onto cores of data processing engines (DPEs) of a DPE array. Further, the processor is caused to generate main code for the cores of the DPEs. Generating the main code includes initializing locks for each of the kernels associated with the cores the DPEs. Each of the locks is associated with a respective input port or output port of a respective one of the kernels. Generating the main code further includes initializing buffers for the kernels. Each of the buffers is associated with a respective lock of the locks and a data stream of data streams. Further, generating the main code includes executing, subsequent to initializing the locks and initializing the buffers, the kernels to generate data samples from the data streams. Generating the main code further includes releasing, subsequent to executing the kernels, the locks associated with the kernels for subsequent calls of the kernels for the cores.

In one or more examples, a computer system includes a memory configured to store program code, and a processor. The processor is configured to execute the program code to map, based on graph representation of an application, kernels of the application onto data processing engines (DPEs) of a DPE array. Further, the processor is configured to execute the program code to generate main code for cores of the DPEs. Generating the main code includes initializing locks for each of the kernels associated with the cores the DPEs. Each of the locks is associated with a respective input port or output port of a respective one of the kernels. Generating the main code further includes initializing buffers for the kernels. Each of the buffers is associated with a respective lock of the locks and a data stream of data streams. Further, generating the main code includes executing, subsequent to initializing the locks and initializing the buffers, the kernels to generate data samples from the data streams. Generating the main code further includes releasing, subsequent to executing the kernels, the locks associated with the kernels for subsequent calls of the kernels for the cores.

SUMMARY

In one or more examples, a method includes mapping, based on a graph representation of an application, kernels of the application onto data processing engines (DPEs) of a DPE array. The method further includes generating main code for cores of the DPEs. Generating the main code includes initializing locks for each of the kernels associated with the cores the DPEs. Each of the locks is associated with a respective input port or output port of a respective one of the kernels. Generating the main code further includes initializing buffers for the kernels. Each of the buffers is associated with a respective lock of the locks and a data stream of data streams. Further, generating the main code includes executing, subsequent to initializing the locks and initializing the buffers, the kernels to generate data samples from the data streams. Generating the main code further includes releasing, subsequent to executing the kernels, the locks associated with the kernels for subsequent calls of the kernels for the cores.

In one or more examples, a non-transitory computer readable medium includes instructions stored thereon. The instructions when executed by a processor cause the processor to map, based on a graph representation of an application, kernels of the application onto cores of DPEs of a DPE array. The processor is further caused to generate main code for the cores of the DPEs. Generating the main code includes initializing locks for the kernels. Each of the locks is associated with a respective input port or output port of a respective kernel of the kernels. Further, generating the main code includes initializing buffers for the kernels. Each of the buffers is associated with a respective lock of the locks and a data stream of data streams. Generating the main code further includes executing, subsequent to initializing the locks and initializing the buffers, one or more of the kernels having an external input to generate data samples from the data streams, and releasing, subsequent to executing the kernels, the locks associated with the kernels.

A computer system includes a memory a memory that stores program code, and a processor that to executes the program code to map, based on a graph representation of an application, kernels of the application onto DPEs of a DPE array. The processor further generates main code for cores of the DPEs. Generating the main code includes initializing locks for each of the kernels associated with the cores the DPEs. Each of the locks is associated with a respective input port or output port of a respective one of the kernels. Further, generalizing the main code includes initializing buffers for the kernels. Each of the buffers is associated with a respective lock of the locks and a data stream of data streams. Generalizing the main code further includes executing, subsequent to initializing the locks and initializing the buffers, the kernels to generate data samples from the data streams, and releasing, subsequent to executing the kernels, the locks associated with the kernels.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 is a block diagram depicting an example of a circuit design system according to an example.

FIG. 11 is a flow diagram depicting a method of generating code and configuration data for a data processing engine array of an SOC according to an example.

FIG. 12 is a flow diagram depicting a method of scheduling locks and buffers for a kernel, according to one or more examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
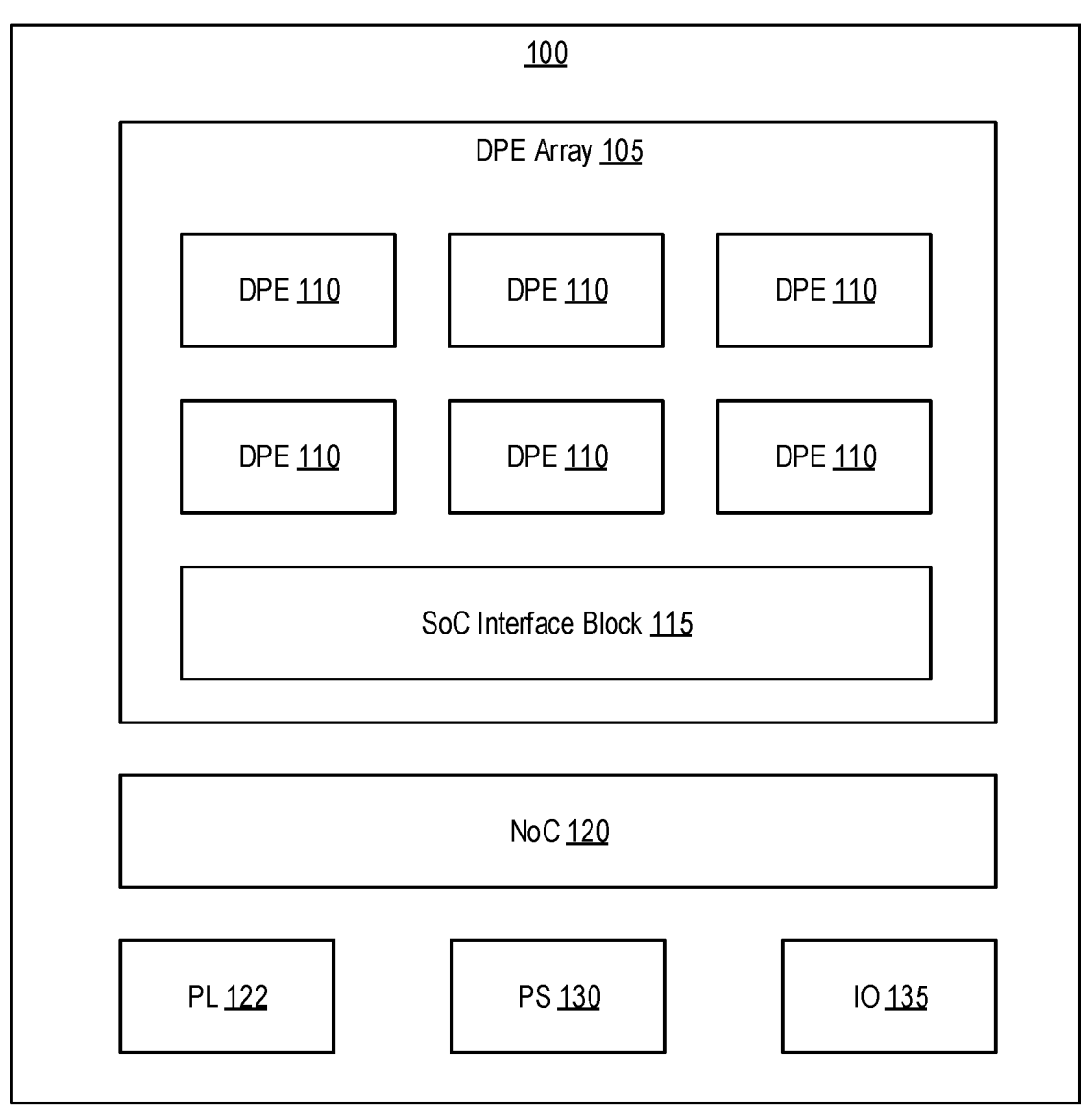
FIG. 1 is a block diagram of an integrated circuit device, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques described herein provide a process for compiling an application to the cores within multi-core architecture. The compiling process includes producing execution binaries for each core and configuration code for programmable components based on the application. For example, an application includes multiple kernels that are mapped to cores within the multi-core architecture. In one example, the compilation steps include transforming an input graph description of an application to an internal representation, performing code analysis and optimization, identifying which computation kernels should be grouped together (e.g., clustering), mapping these groups to specific data processing engines (e.g., cores) and the data structures used by the kernels to local memory. The compilation steps further include generating wrapper code to orchestrate the execution of each data processing engine, generating the configuration code for the direct memory access (DMA)

circuitry and stream switches, and generating a program for execution by a processing system to control the application.

In one or more examples, mapping the data structures used by the kernels to the local memory includes assigning locks and buffers to the kernels. Locks provide synchronization of reading and writing data to and from the buffers by a kernel or kernels. As will be described in further detail in the following, the locks may be implemented as hardware synchronization circuitry. As will be described in greater detail in the following, buffers facilitate the communication of data to and from the kernels. The following processing for assigning locks and buffers unitizes the locks and buffers before kernel calls are made. In one or more examples, a processing loop (e.g., a while loop or other loop type) is used execute the kernels. As is described in more detail in the following, by initiating the locks and buffers before a kernel is called, and adjusting the buffers after the kernel call, the scheduling of the locks and buffers associated with the kernels is improved, improving the mapping of the kernels to the cores of a multi-core architecture. Accordingly, the reading and writing of data within a multi-core device executing the corresponding application is improved, improving the performance of the multi-core device.

FIG. 1 is a block diagram of an IC device 100 that includes a data processing engine (DPE) array 105, according to an example. In examples, IC device 100 is a System-on-Chip (SoC) type of device. In general, an SoC refers to an integrated circuit (IC) device that includes two or more subsystems capable of interacting with one another. In one example, an SoC may include a processor that executes program code and one or more other circuits. The other circuits may be implemented as hardwired circuitry, programmable circuitry, other subsystems, and/or any combination thereof. The circuits may operate cooperatively with one another and/or with the processor. The DPE array 105 includes a plurality of DPEs 110 that may be arranged in a grid, cluster, or checkerboard pattern (or another pattern) in the IC device 100. Although FIG. 1 illustrates arranging the DPEs 110 in a 2D array with rows and columns, the examples are not limited to this arrangement. Further, the array 105 can be any size and have any number of rows and columns formed by the DPEs 110. Further, the number of DPEs may be greater than or less than that illustrated in FIG. 1.

In one example, the DPEs 110 are identical. That is, each of the DPEs 110 (also referred to as tiles or blocks) may have the same hardware components or circuitry. Further, the examples herein are not limited to DPEs 110. Instead, the IC device 100 can include an array of any kind of processing elements or data processing engines. Moreover, the DPEs 110 could be cryptographic engines, accelerator engines, artificial intelligence (AI) engines, machine learning (ML) engines, or other specialized hardware for performing one or more specialized tasks. As such, the DPEs 110 can be referred to generally as data processing engines.

In FIG. 1, the array 105 includes DPEs 110 that are all the same type (e.g., a homogeneous array). However, in another example, the array 105 may include different types of engines. For example, the array 105 may include DPEs 110, cryptographic engines, forward error correction (FEC) engines, AI engines, ML engines, and the like. Regardless if the array 105 is homogenous or heterogeneous, the DPEs 110 can include connections to memory modules in neighboring DPEs 110 which permit the DPEs 110 to share the memory modules as described in more detail below.

In one example, the DPEs 110 are formed from non-programmable logic—i.e., are hardened. In such an example, the DPEs 110 may take up less space in the IC device 100 relative to using programmable logic to form the hardware elements in the DPEs 110. That is, using hardened or non-programmable logic circuitry to form the hardware elements in the DPEs 110 such as program memories, an instruction fetch/decode unit, fixed-point vector units, floating-point vector units, arithmetic logic units (ALUs), multiply accumulators (MAC), and the like can significantly reduce the footprint of the array 105 in the IC device 100. Although the DPEs 110 may be hardened, this does not mean the DPEs 110 are not programmable. That is, the DPEs 110 can be configured when the IC device 100 is powered on or rebooted to perform different functions or tasks.

Although FIG. 1 illustrates a device 100 having a single DPE array 105, in other examples, the IC device 100 may have multiple DPE arrays 105.

The DPE array 105 also includes an SoC interface block 115 that serves as a communication interface between the DPEs 110 and other hardware components in the IC device 100. In this example, the IC device 100 includes a network on chip (NoC) 120 that is communicatively coupled to the SoC interface block 115. Although not shown, the NoC 120 may extend throughout the IC device 100 to permit the various components in the IC device 100 to communicate with each other. For example, in a physical implementation, the DPE array 105 may be disposed in an upper right portion of the integrated circuit forming the IC device 100. However, using the NoC 120, the array 105 can nonetheless communicate with various subsystems, for example, programmable logic (PL) 120, a processor subsystem (PS) 130 or input/output (I/O) 135 which may disposed at different locations throughout the IC device 100.

In addition to providing an interface between the DPEs 110 and the NoC 120, the SoC interface block 115 may also provide a connection directly to a communication fabric in the PL 122. In one example, the SoC interface block 115 includes separate hardware components for communicatively coupling the DPEs 110 to the NoC 120 and to the PL 122 that is disposed near the array 105 in the IC device 100.

Although FIG. 1 illustrates one block of PL 122, the IC device 100 may include multiple blocks of PL 122 (also referred to as configuration logic blocks) that can be disposed at different locations in the IC device 100. For example, the IC device 100 may include hardware elements that form a field programmable gate array (FPGA). However, in other examples, the IC device 100 may not include any PL 122—e.g., the IC device 100 is an ASIC.

Figure 2:
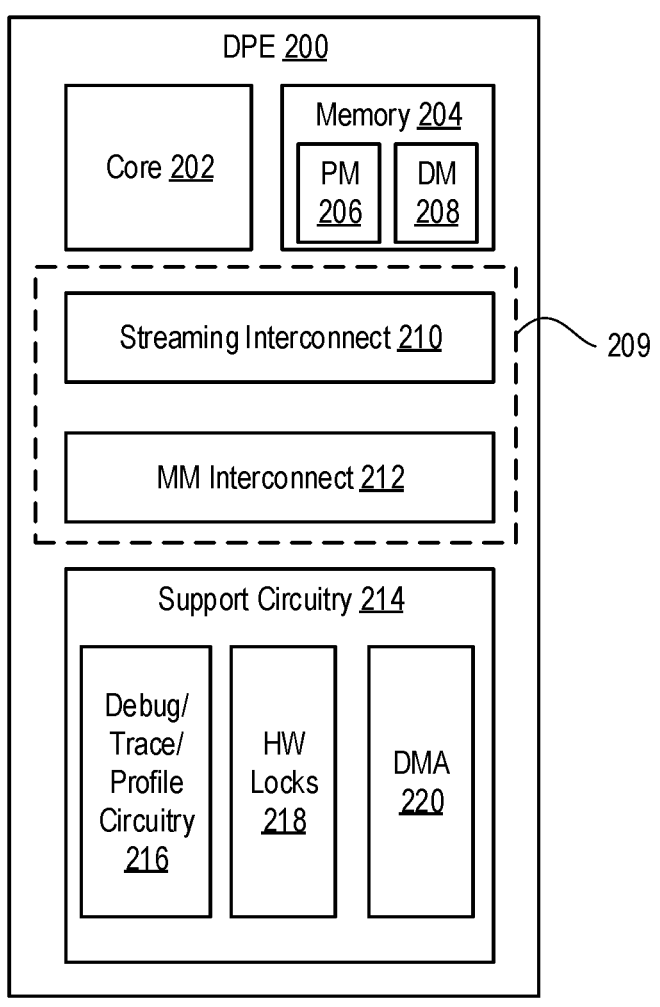
FIG. 2 is a block diagram depicting a tile circuit according to an example.

FIG. 2 is a block diagram depicting a DPE 200 according to an example. The DPE 200 can be used to implement one or more of the DPE 110 in the DPE array 105 of FIG. 1. The DPE 200 includes a core 202, memory 204, DPE interconnect 209, and support circuitry 214. The DPE interconnect 209 includes streaming interconnect 210 and memory-mapped (MM) interconnect 212. In an example, the support circuitry 214 includes debug/trace/profile circuitry 216, hardware (HW) synchronization circuitry ("HW locks 218"), and direct memory access (DMA) circuitry ("DMA 220"). The memory 204 includes program memory ("PM 206") and data memory ("DM 208").

The core 202 includes one or more compute units for processing data according to instruction(s) stored in the PM 206. In an example, the core 202 includes a very-long instruction word (VLIW) processor, a single instruction, multiple data (SIMD) or vector processor, or a VLIW SIMD/vector processor. In an example, the PM 206 is private to the core 202 (e.g., the PM 206 stores instruction(s) only for use by the core 202 in the DPE 200). In an example, the PM 206 comprises a single-ported random access memory (RAM). The PM 206 can be coupled to the MM interconnect 212 for configuration and loading of instructions. In an example, the PM 206 supports parity, error-correcting code (ECC) protection and reporting, or both parity and ECC. For example, the PM 206 can support 9-bit ECC and be able to correct a 1-bit error or 2-bit errors in a program instruction (e.g., 128 bits).

The core 202 can be directly coupled to the streaming interconnect 210 to receive input stream(s) and/or provide output stream(s). In addition, the core 202 can read and write data to the DM 208 in the DPE 200. As discussed further below, the core 202 in the DPE 200 can also access the DM in one or more neighboring DPEs (e.g., north, south, east, and west neighboring tile circuits). In an example, as discussed further below, the core 202 can also include a direct connection with one or more neighboring DPEs for forwarding accumulator output (e.g., input and output cascading connection(s)). In an example, the core 202 sees the DM in a neighboring DPE as one contiguous block of memory. The core 202 can also include an interface to the HW locks 218 and an interface to the debug/trace/profile circuitry 216. The debug/trace/profile circuitry 216 can include trace, debug, and/or profile circuitry.

The MM interconnect 212 can be an AXI memory-mapped interconnect or the like configured for transmission of data using address transactions between components. In an example, the MM interconnect 212 is used for configuration, control, and debugging functionality for the DPE 200. The MM interconnect 212 includes one or more switches that route transactions based on address. Circuitry can use the MM interconnect 212 to access the memory 204, the core 202, the DMA 220, and configuration registers in the DPE 200.

The streaming interconnect 210 can be an Advanced eXtensible Interconnect (AXI) streaming interconnect or the like configured for transmission of streaming data between components. The streaming interconnect 210 is used for transferring data between the DPE 200 and external circuits. The streaming interconnect 210 can support both circuit switching and packet switching mechanisms for both data and control.

In an example, as described further below, the DM 208 can include one or more memory banks (e.g., random access memory (RAM) banks). The DMA 220 is coupled between the streaming interconnect 210 and the DM 208. The DMA 220 is configured to move data from the streaming interconnect 210 to the DM 208 and move data from the DM 208 to the streaming interconnect 210. In this manner, an external circuit (e.g., a circuit configured in programmable logic or a circuit in an embedded processing system of the IC) can read data from and write data to the DM 208 through the streaming interconnect 210 using DMA. The DMA 220 can be controlled through the MM interconnect 212 and/or the streaming interconnect 210. In an example, the DM 208 supports parity, error-correcting code (ECC) protection and reporting, or both parity and ECC. For example, the DM 208 can support 9-bit ECC (e.g., 128-bits data).

The HW locks 218 could be used to lock particular memory banks of the DM 208 for access by the core 202, another DPE in another tile, or the DMA 220. The HW locks 218 provide synchronization between neighboring DPEs in neighboring tiles, between the core 202 and the DMA 220, and between the core 202 and an external circuit (e.g., an external processor). The HW locks 218 can also be used to lock a particular buffer in the DM 208, which may be stored in one or more memory banks or in a portion of a single memory bank. The debug/trace/profile circuitry 216 is configured to provide debug, trace, and profile functions. The debug/trace/profile circuitry 216 can trace events generated by circuits in the DPE 200. The debug/trace/profile circuitry 216 can provide profile functionality, for example, configurable performance counters.

Figure 3:
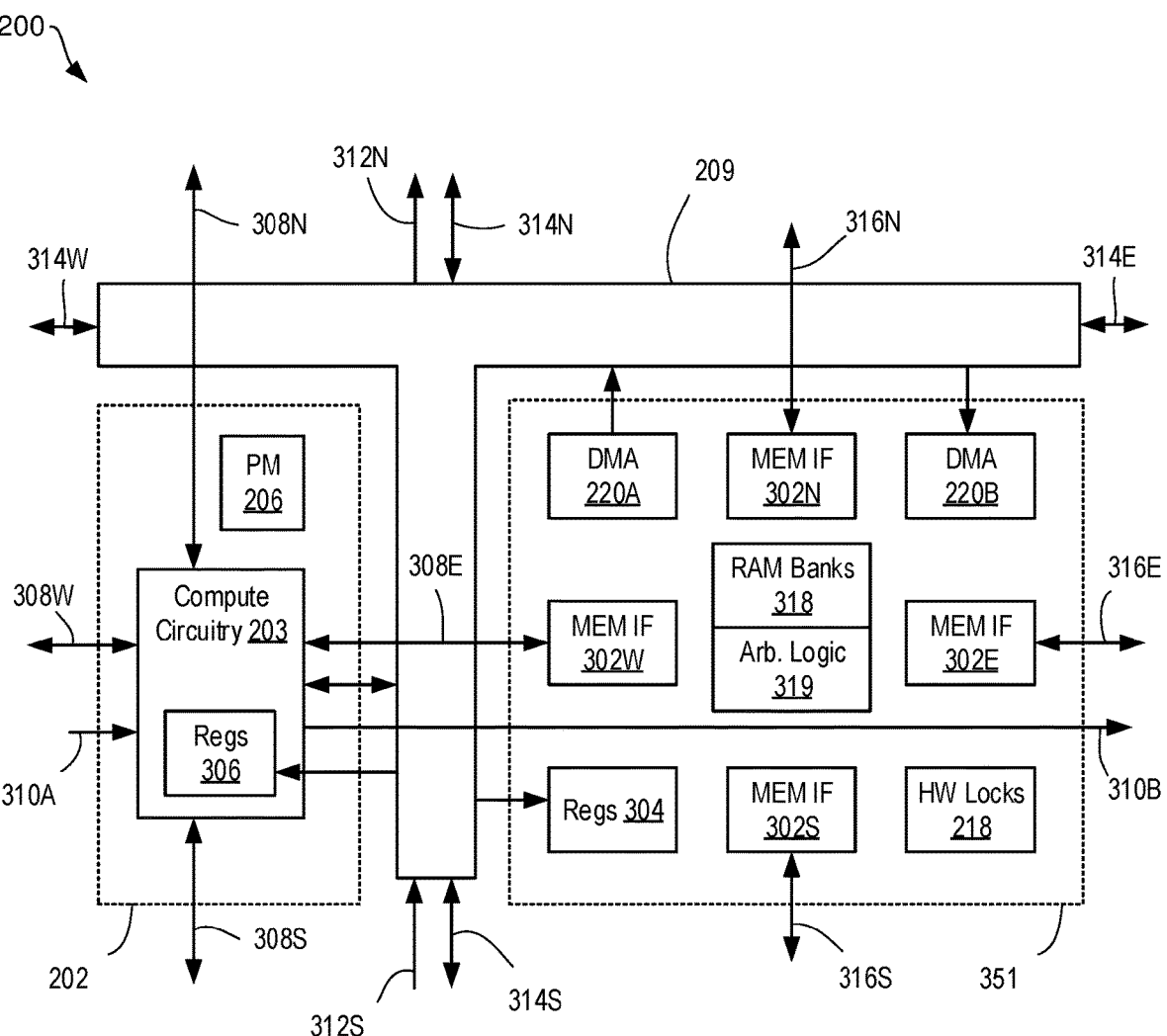
FIG. 3 is a block diagram depicting the tile circuit of FIG. 2 in more detail according to an example.

FIG. 3 is a block diagram depicting the DPE 200 in more detail according to an example. In the example, the DPE 200 includes core 202, a memory module 351, and DPE interconnect 209. The core 202 includes the compute circuitry 203 and the PM 206. The memory module 351 includes memory interfaces 302N, 302S, 302E, and 302W (collectively memory interfaces or individually "mem IF"), RAM banks 318, the HW locks 218, registers ("regs 304"), a DMA interface 204A, and a DMA interface 220B. The compute circuitry 203 includes registers ("regs 306"). The DPE interconnect 209 includes the MM interconnect 212 and the streaming interconnect 210 (shown in FIG. 2). Both the MM interconnect 212 and the streaming interconnect 210 can access the RAM banks 318. The RAM banks 318 include arbitration logic 319 per bank. The arbitration logic 319 is configured to control which interface (N, S, E, W, DMA, external PS, etc.) has access to which bank. Further details of the DPE interconnect 209 are discussed below with respect to the example of FIG. 4.

The DPE interconnect 209 includes a streaming connection 314W to a west tile, a streaming connection 314E to an east tile, a streaming connection 314N to a north tile, and a streaming connection 314S to a south tile. Each streaming connection 314 includes one or more independent streaming interfaces (e.g., busses), each having a specific bit width. The DPE interconnect 209 also includes a memory-mapped connection 312S from a south tile and a memory-mapped connection 312N to a north tile. Although only north and south MM connections are shown, it is to be understood that the DPE interconnect 209 can include other configurations for the MM interconnect (e.g., east-to-west, west-to-east, north-to-south, and the like). It is to be understood that the DPE interconnect 209 can include other arrangements of streaming and memory-mapped connections than shown in the example of FIG. 3. In general, the DPE interconnect 209 includes at least one streaming connection 314 and at least one memory-mapped connection 312.

The compute circuitry 203 includes a connection 308W to memory circuitry in a west tile, a connection 308S to memory circuitry in a south tile, a connection 308N to memory circuitry in a north tile, and a connection 308E to the memory module 351. The compute circuitry 203 include a streaming interface to the DPE interconnect 209. The compute circuitry 203 also includes a connection 310A from a core in the west tile and a connection 310B to a core in the east tile (e.g., cascading connections). In other examples, the DPE can include other arrangements of memory and cascading connections than shown in the example of FIG. 3. In general, the compute circuitry 203 includes at least one memory connection and can include at least one cascading connection.

The mem IF 302W is coupled to the memory connection 308E of the compute circuitry 203. The mem IF 302N is coupled to a memory connection of the data processing engine in the north tile. The mem IF 302E is coupled to a memory connection of the data processing engine in the east tile. The mem IF 302S is coupled to a memory connection of the data processing engine in the south tile. The mem IF 302W, 302N, 302E, and 302S are coupled to the RAM banks 318. The DMA 220A includes an output coupled to the DPE interconnect 209 for handling memory to interconnect streams. The DMA 220B includes an input coupled to the DPE interconnect 209 for handling interconnect to memory streams. The regs 304 and the regs 306 are coupled to the DPE interconnect 209 to receive configuration data therefrom (e.g., using the memory-mapped interconnect).

Figure 4:
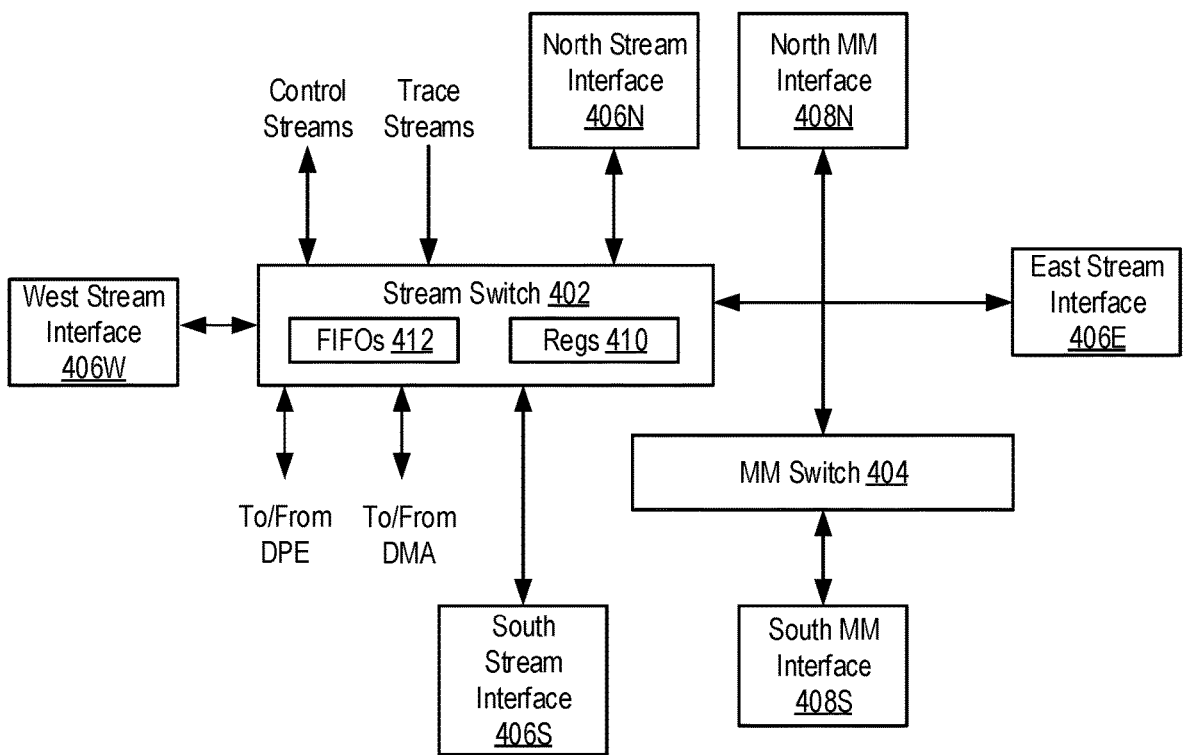
FIG. 4 is a block diagram depicting tile interconnect circuitry according to an example.

FIG. 4 is a block diagram depicting the DPE interconnect 209 according to an example. The DPE interconnect 209 includes a stream switch 402 and an MM switch 404. The stream switch 402 is coupled to a west stream interface 406W, a north stream interface 406N, an east stream interface 406E, and a south stream interface 406S. The west stream interface 406W receives and provides streams to the DPE interconnect of a west tile. The north stream interface 406N receives and provides streams to the DPE interconnect of a north tile. The west stream interface 406W receives and provides streams to the DPE interconnect of a west tile. The south stream interface 406S receives and provides streams to the DPE interconnect of a south tile. The MM switch 404 is coupled to a north MM interface 408N and a south MM interface 408S. The north MM interface 408N is coupled to the DPE interconnect in the north tile. The south MM interface 408S is coupled to the DPE interconnect in the south tile.

The stream switch 402 includes first-in-first-out (FIFO) circuits (FIFOs 412) and registers (regs 410). The FIFOs 412 are configured to buffer streams passing through the stream switch 402. The regs 410 store configuration data for the stream switch 402 that controls the routing of streams through the stream switch. The regs 410 can receive configuration data from the MM switch 404. The stream switch 402 can include an additional interface to the compute circuitry 203 and an additional interface to the DMA circuitry 220. The stream switch 402 can send and receive control streams and receive trace streams (e.g., from the debug/trace/profile circuitry 216).

FIG. 5 is a block diagram depicting an example of a circuit design system 500 according to an example. The circuit design system 500 includes a computer 501 coupled to input/output (IO) devices 512, a display 514, and the IC device 100. The computer 501 includes a hardware platform 518 can include conventional components of a computing device, such as a central processing unit (CPU) 502, system memory 508, various support circuits 504, storage 520, and an IO interface 506. The CPU 502 can include one or more microprocessors. The CPU 502 is configured to execute instructions that perform one or more operations described herein. The instructions can be stored in system memory 508, storage 520, or any other memory in the hardware platform 518 (e.g., cache memory). The system memory 508 includes devices that store information and can include, for example, random access memory (RAM), read-only memory (ROM), or a combination thereof. The storage 520 includes local storage devices, such as hard disks, flash memory modules, solid state disks, optical disks, and the like. The storage 520 is a non-transitory computer readable medium. The storage 520 can also include interface(s) configured for communication with one or more network data storage systems. The support circuits 504 can include conventional cache, power supplies, clock circuits, data registers, IO interfaces, and the like. The IO interface 506 includes conventional interfaces to the computer 501 known in the art. The IO interface 506 can be coupled to the IO devices 512, which can include conventional keyboard, mouse, and the like. The IO interface 506 can also be coupled to the display 514, which can present a GUI 516 to a user.

The computer 501 further includes a software platform comprising an operating system (OS) 522 and a design tool 510. The OS 522 and the design tool 510 include instructions that are executed by the CPU 502. The OS 522 can include any known operating system, such as Linux®, Microsoft Windows®, Mac OS®, and the like. The design tool 510 is an application that executes within the OS 522, which provides an interface to the hardware platform 518. Operation of the design tool 510 is discussed below.

Figure 6:
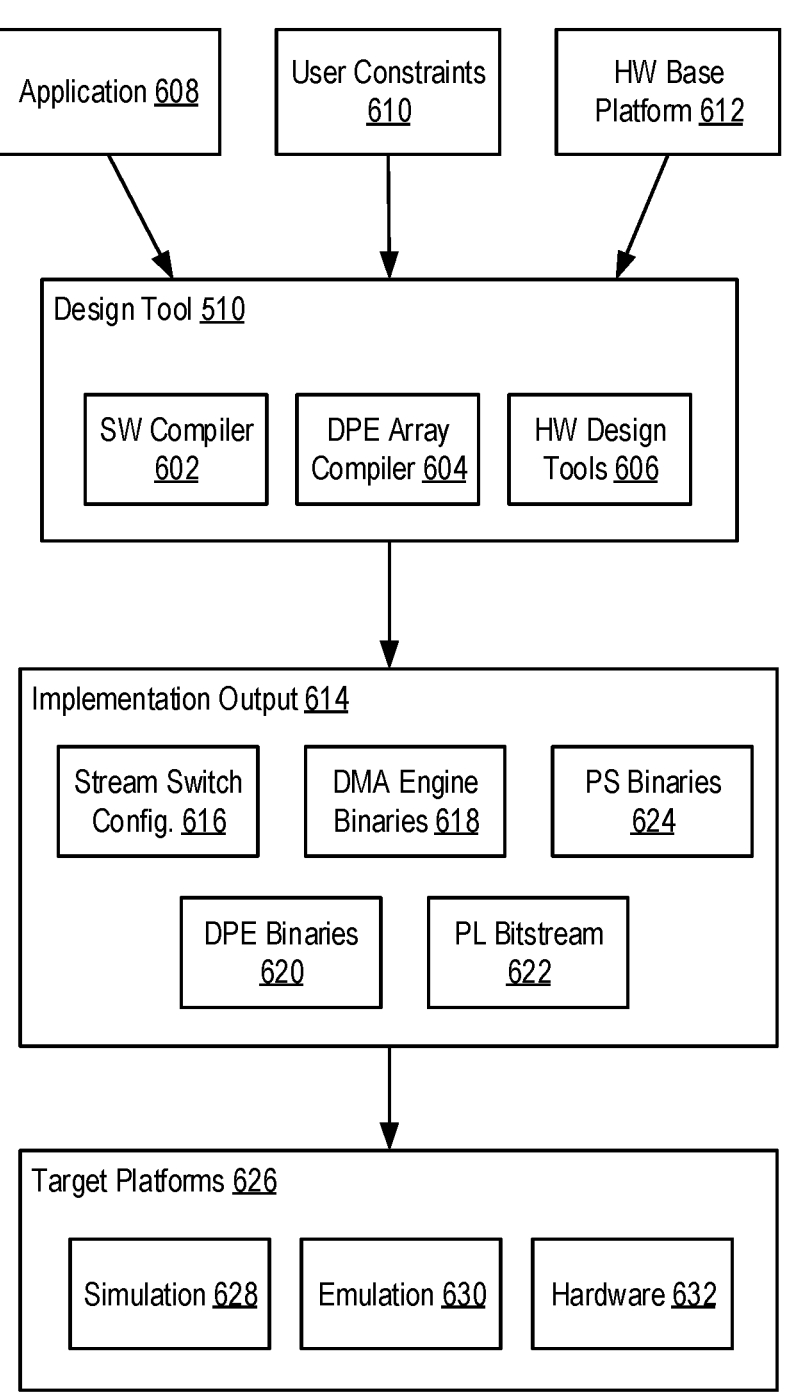
FIG. 6 is a block diagram depicting implementation of an application for a target platform according to an example.

FIG. 6 is a block diagram depicting implementation of an application for a target platform according to an example. The design tool 510 includes a software compiler ("SW compiler 602"), a DPE array compiler 604, and hardware design tools ("HW design tools 606"). The design tool 510 receives an application 608, user constraints 610, and a hardware base platform ("HW base platform 612"). The user defines the application 608, which is to be implemented for the IC device 100. The application 608 includes portions that map to the PL 122, the PS 130, and the DPE array 105. The SW compiler 602 is configured to compile the portion of the application 608 that maps to the PS 130, which can include source code defined using any programming language (e.g., C, C++, and the like). The HW design tools 606 are configured to implement the portion of the application 608 that maps to the PL 122, which can include circuit descriptions defined using any hardware description language (HDL), register transfer language (RTL), high-level synthesis (HLS) models, concurrent programming language (e.g., SystemC), or the like. The DPE array compiler 604 is configured to compile the portion of the application 608 that targets the DPE array 105, which is defined further below.

Figure 7:
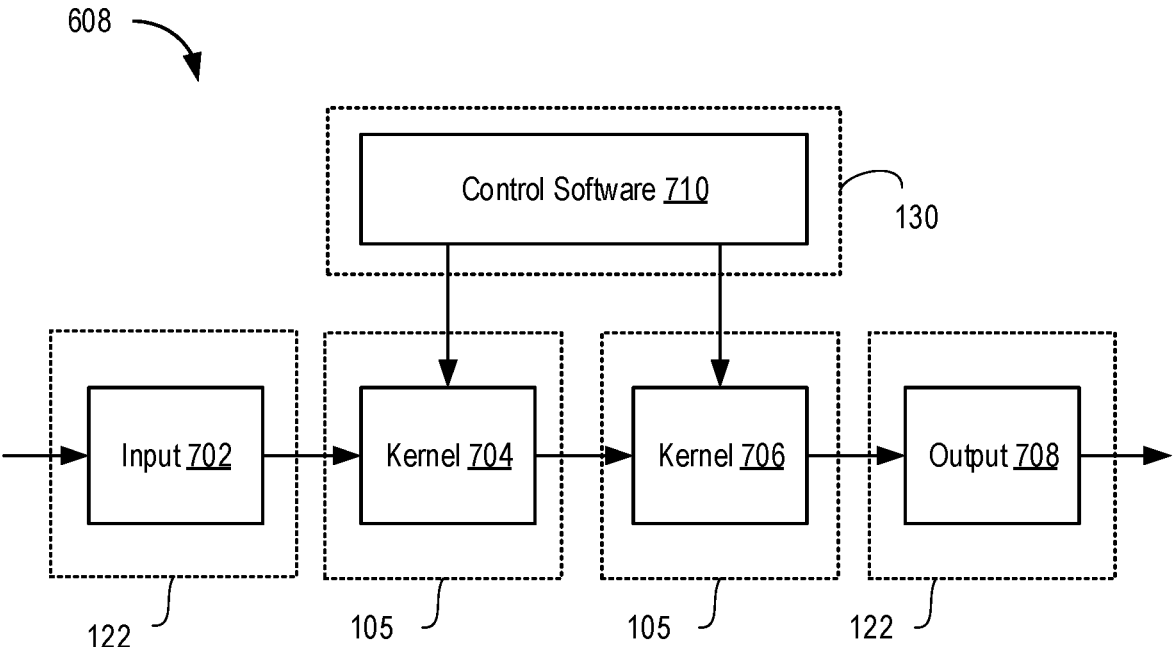
FIG. 7 is a block diagram depicting an application according to an example.

FIG. 7 is a block diagram depicting the application 608 according to an example. A user interacts with the design tool 510 to define the application 608 targeting the IC device 100. In the example, the application 608 includes an input circuit 702, a kernel 704, a kernel 706, an output circuit 708, and control software 710. The input circuit 702 is coupled to the kernel 704 and provides data to the kernel 704. The kernel 704 is coupled to the kernel 706 and provides data to the kernel 706. The kernel 706 is coupled to the output circuit 708 and provides data to the output circuit 708. The control software 710 controls the kernel 704 and the kernel 706 and provides data thereto. In general, an application 608 includes one or more circuits, one or more kernels, and control software connected to each other in a specific fashion depending on the design.

In the example, the input circuit 702 comprises digital logic (and optionally analog logic) configured to communicate with external systems/circuits, as well as provide data to the kernel 704 for processing. The input circuit 702 maps to the PL 122. Likewise, the output circuit 708 comprises digital logic (and optionally analog logic) configured to communicate with external systems/circuits, as well as receive data from the kernel 706 that has been processed. The output circuit 708 maps to the PL 122. In an example, the kernels 704 and 706 include a programmatic description of data processors. The kernels 704 and 706 map to the DPE array 105. The control software 710 is a programmatic description of a controller for the kernels 704 and 706. In an example, the control software 710 maps to the PS 130.

Returning to FIG. 6, the implementation data 614 includes stream switch configuration code 616, DMA engine configuration code 618, PS binaries 624, DPE binaries 620, and a PL bitstream 622. The SW compiler 602 generates the PS binaries 624 from the source code of the application 608 that targets the PS 130 (e.g., the control software 710). The PS binaries 624 are configured to target a particular microprocessor architecture (e.g., x86, ARM®, and the like). The HW design tools 606 generate the PL bitstream 622 from the portion of the application 608 that targets the PL 122 (e.g., the input circuit 702 and the output circuit 708). The PL bitstream 622 targets a particular SOC device. The DPE array compiler 604 generates the stream switch configuration code 616, the DMA engine configuration code 618, and the DPE binaries 620 based on the portion of the application 608 that targets the DPE array 105 (e.g., the kernels 704 and 706). The stream switch configuration code 616 includes data for programming stream switches 402 in the DPE interconnect 209. The DMA engine configuration code 618 includes data for programming DMA circuitry 220 in memory modules 351 of DPEs 110. The DPE binaries 620 include code for execution by the compute circuitry 203 in cores 202 of DPEs 110.

The implementation output 614 is configured for implementation on target platforms 626. The target platforms 626 include simulation platforms ("simulation 628"), emulation platforms ("emulation 630"), and hardware platforms ("hardware 632"). The hardware 632 includes the IC device 100. The simulation and emulation platforms 628 and 630 simulate/emulate the hardware 632.

Figure 8:
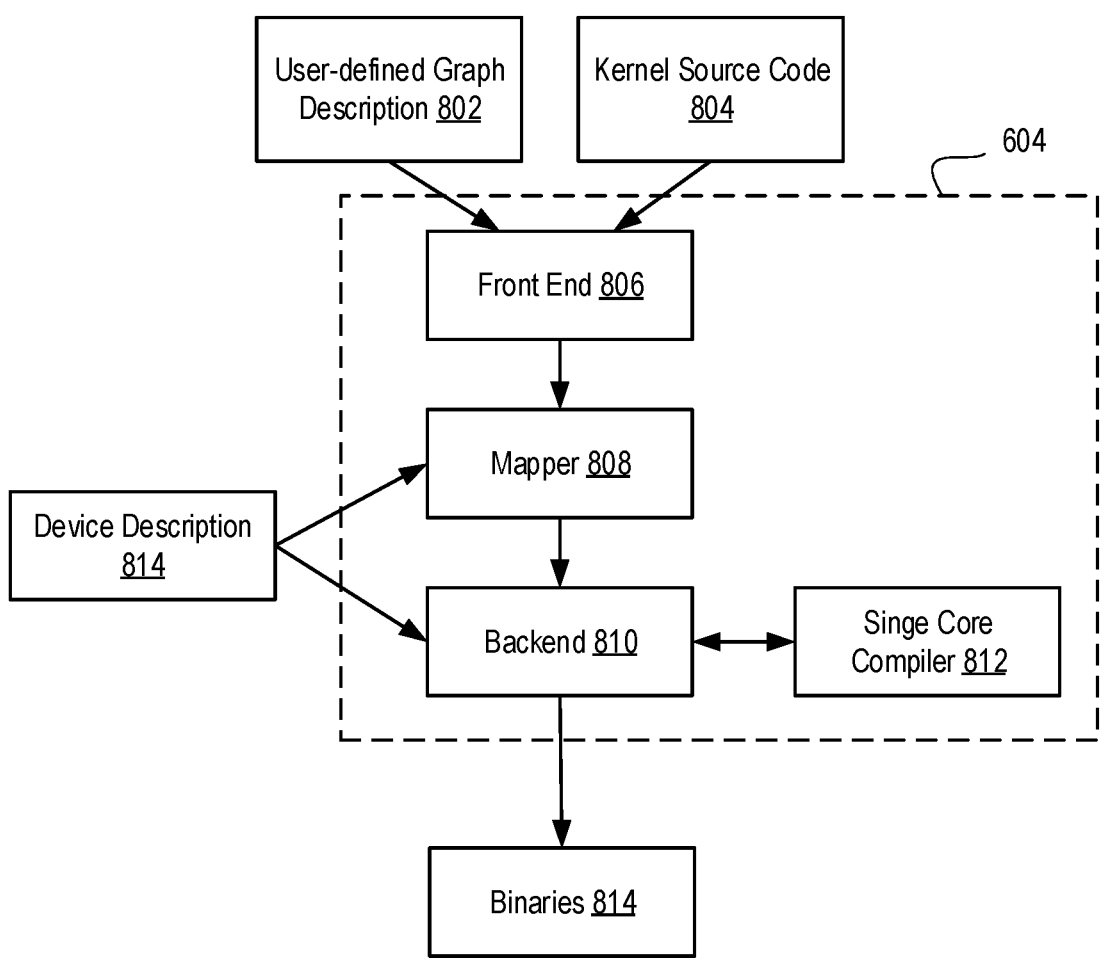
FIG. 8 is a block diagram depicting a data processing engine (DPE) array compiler according to an example.

FIG. 8 is a block diagram depicting the DPE array compiler 604 according to an example. The DPE array compiler 604 includes a front end 806, a mapper 808, a backend 810, and a single core compiler 812. Although the DPE array compiler 604 is described as having discrete components, it is to be understood that the functionality of those components can be implemented using more or less components in different configurations than the example shown in FIG. 8. The portion of the application 608 that targets the DPE array 105 includes a user-defined graph description 802 and kernel source code 804. The user-defined graph description 802 describes the components and their connectivity (e.g., the input circuit 702, the kernels 704 and 706, the output circuit 708, and the control software 710). The kernel source code 804 provides programmatic descriptions of functions to be implemented in DPEs 110 of the DPE array 105.

The user-defined graph description 802 can be specified using various programming languages (e.g., C, C++, etc.) or data structure languages (e.g., XML, JSON, etc.). One example of the user-defined graph description 802 specified in C++ is shown below:

```
using namespace cardano;
class radio :
    cardano::graph {
public:
    cardano::kernel a,b,c,d,e,f;
radio( ) {
    a = kernel::create(polarclip);
    b = kernel::create(feedback);
    c = kernel::create(equalizer);
    d = kernel::create(fir_tap11);
    e = kernel::create(fir_tap7);
    f = kernel::create(scale);
    fabric<fpga>(a);
    fabric<fpga>(f);
    connect<stream, window<64,8> >( a.out[0], b.in[0] );
    connect<window<32> >        ( b.out[0], c.in[0] );
    connect<window<32, 24> >    ( c.out[0], d.in[0] );
    connect<window<32, 16> >    ( d.out[1], e.in[0] );
    connect<window<32, 8> >     ( e.out[0], b.in[1] );
    connect<window<16>, stream > ( d.out[0], f.in[0] );
    }
}
```

In the example above, the radio class is derived from a class library (cardano) with graph building primitives. Using these primitives, the user-defined graph description 802 defines compute nodes a, b, c, d, e, and f. The compute nodes a and f are circuits mapped to the PL 122. The compute nodes b, c, d, and e are kernels mapped to the DPE array 105. The circuit a is connected to the kernel b using a DMA streaming connection. The kernel b is connected to the kernel c; the kernel c is connected to the kernel d; the kernel d is connected to the kernel e; and the kernel e is connected to the kernel b, where each such connection is through memory blocks in the DPE 105. The kernel d is connected to the circuit F through a DMA streaming connection.

The user-defined graph description 802 can also include a top-level description of the platform. For example:

radio mygraph;
simulation::platform<1, 1> platform("in.txt", "out.txt");
connect< > net0(platform.src[0], mygraph.in);
connect< > net1(platform.sink[0], mygraph.out);

In the example above, the user instantiates the radio class (mygraph) and sets up a simulation target. The user can also specify a control program for execution on the PS 130, such as:

```
int main(void) {
    mygraph.init( );
    mygraph.run( );
    mygraph.end( );
    return 0;
}
```

In the example above, the user initializes mygraph, executes mygraph, and ends mygraph for purposes of simulation in the simulation platform.

The kernel source code 804 provides a source code description for each compute node targeting a DPE 110 (e.g., compute nodes b, c, d, and e in the example above). The kernel source code 804 can be defined using any programming language (e.g., C, C++, etc.). Example C++ source code for defining the compute node c (equalizer) is shown below:

```
void equalizer (input_window_cint16 * inputw,
output_window_cint16 * outputw) {
    ...
    v32cint16 sbuff = null_v32cint16( );
    vfor ( unsigned i=0; i<LSIZE; i++)
        chess_loop_range(2,)
        chess_prepare_for_pipelining
    {
        v4cacc48 acc;
        v8cint16 coe, vdata;
        coe = *coeff++; // LD coefficients 0:7
        window_readincr(inputw, vdata);
        sbuff = upd_w0(sbuff, vdata); // LDw0 data 0:7 - 0:7|X|X|X
        acc = mul4_nc( sbuff, 1, 0x3210, 1, coe, 0, 0x0000, 1);
        // d01:d05 | c0:c1
        acc = mac4_nc(acc, sbuff, 3, 0x3210, 1, coe, 2, 0x0000, 1);
        // d03:d07 | c2:c3
        window_readincr(inputw, vdata);
        sbuff = upd_w1(sbuff, vdata);
        acc = mac4_nc(acc, sbuff, 5, 0x3210, 1, coe, 4, 0x0000, 1);
        // d05:d09 | c4:c5
        acc = mac4_nc(acc, sbuff, 7, 0x3210, 1, coe, 6, 0x0000, 1);
        // d07:d11 | c6:c7
        coe = *coeff++; // LD coefficients 8:15
        window_readincr(inputw, vdata);
        sbuff = upd_w2(sbuff, vdata); // LDw2 data 16:23 - 0:7|8:15|16:23|X
        ...
        window_writeincr(outputw,fsrs(acc,shift));
```

-continued

```
    ...
    }
}
```

In the example, the compute node c (equalizer) is implemented using a C/C++ function with input parameters defining the input of the compute node. The code includes pragmas to assist in scheduling for performance. The code includes intrinsics for performing vectorized computations and application programming interfaces (APIs) for accessing data.

The front end 806 is configured to process the user-defined graph description 802 and generate a directed graph as an internal representation. In the directed graph, nodes represent compute nodes and edges represent connections between compute nodes. The mapper 808 is configured to implement the directed graph for a DPE array 105 in a target device based on a device description 814. The mapper 808 partitions the compute nodes into groups, and maps the partitioned compute nodes to DPEs 110. The backend 810 is configured to route the connections between DPEs 110 and circuits in the PL 122, then invoke the single core compiler 812 to generate DPE binaries, and also generate stream switch and DMA configuration code based on the output of the mapper 808.

Figure 9A:
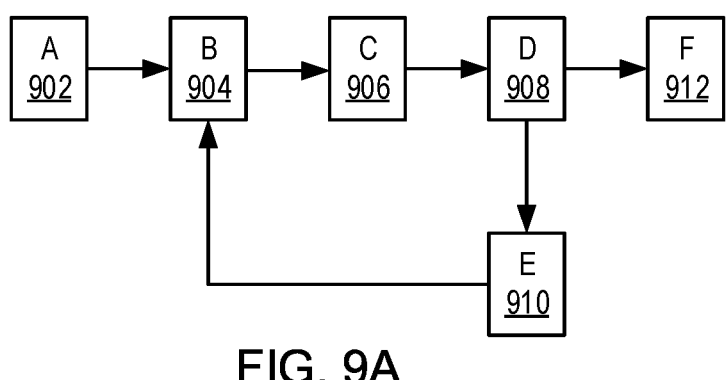
FIGS. 9A-9D are block diagrams depicting an example directed graph representation of a portion of the application targeting the DPE array according to an example.
Figure 9B:
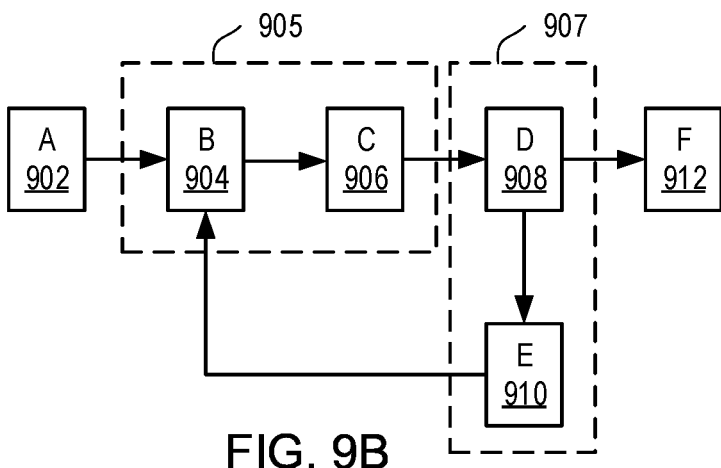
Figure 9C:
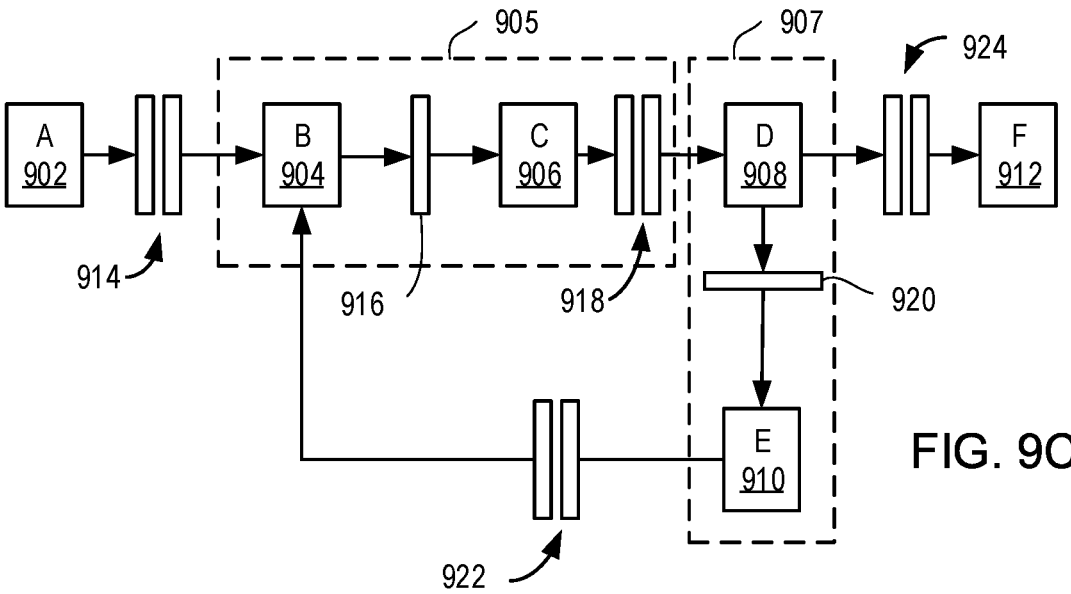
Figure 9D:
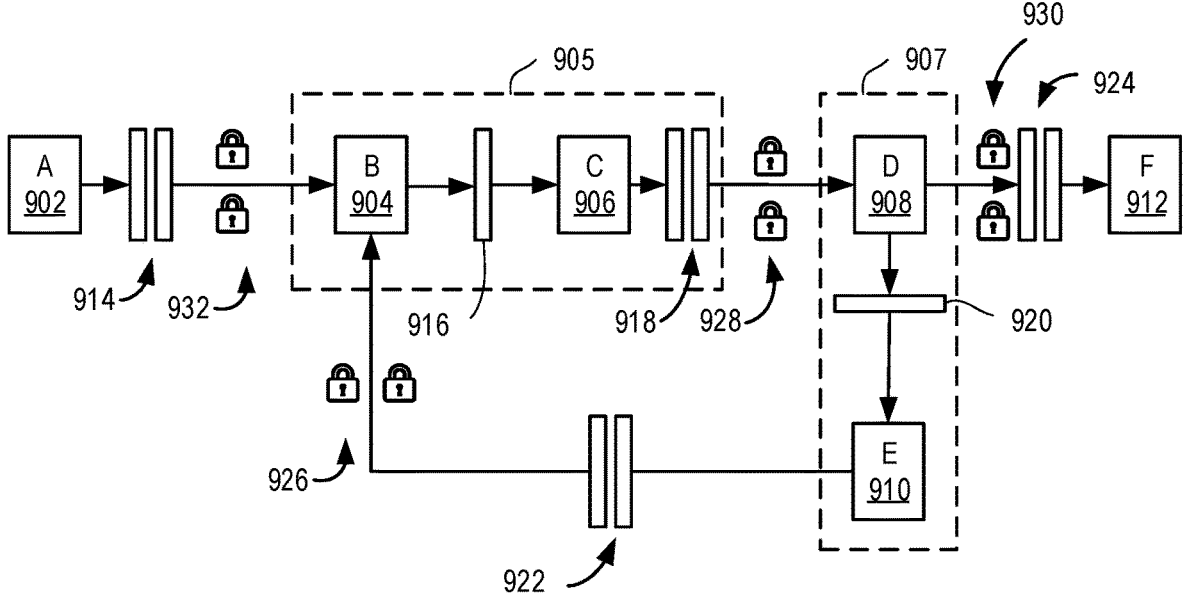
Figure 10:
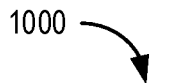
FIG. 10 is a block diagram depicting placement and routing of the directed graph in the DPE array according to an example.

FIGS. 9A-9D are block diagrams depicting an example directed graph representation of a portion of the application 608 targeting the DPE array 105 according to an example. FIG. 10 is a block diagram depicting placement and routing of the directed graph in the DPE array 105. The directed graph in FIGS. 9A-9D represents the example described above for the user-defined graph description 802 having the compute nodes a, b, c, d, e, and f, where compute nodes a and f map to the PL 122 and compute nodes b, c, d, and e map to the DPE array 105. As shown in FIG. 9A, the directed graph includes nodes A 902, B 904, C 906, D 908, E 910, and F 912. The node A is connected to the node B; the node B is connected to the node C; the node C is connected to the node D; the node D is connected to the node F and the node E; and the node E is connected to the node B. FIGS. 9B-9D depict how the mapper 808 processes the directed graph through various steps, as described further below.

FIG. 11 is a flow diagram depicting a method 1100 of generating code and configuration for the DPE array 105 of the IC device 100 according to an example. The method 1100 is performed by the design tool 510 executing on the computer system 501. As noted above, the design tool 510 is configured to process the application 608 to generate code and configuration data for the IC device 100. In one or more examples, the method 1100 is performed by the DPE array compiler 604.

The method 1100 begins at step 1102, where the DPE array compiler 604 parses the application 608 and generates a directed graph based on a user-defined graph description of the design. In an example, the DPE array compiler 604 identifies the compute nodes 902-912 and connections between them. The DPE array compiler 604 then forms a graph where the nodes are the kernels and the edges are connections, as shown in FIG. 9A.

At step 1104, the DPE array compiler 604 processes the directed graph to cluster kernels into groups that can execute on a core in a data processing engine. In the example, the kernels are selected from compute nodes B 904, C 906, D 908, and E 910. That is, each DPE 110 can execute one or more kernels and the DPE array compiler 604 determines which of the kernels can be combined for execution as groups. As shown in FIG. 9B, the DPE array compiler 604 can combine node B 904 and node C 906 into a group 905, and the node D 908 and the node E 910 into a group 907.

At step 1106, the DPE array compiler 604 processes the code defining each the kernels for optimization to improve performance and reduce memory footprint of the kernel clusters. At step 1108, the DPE array compiler 604 maps the kernels (or kernel clusters if any) onto the DPEs 110 in the DPE array 105. As shown in FIG. 10, the kernels represented by nodes B 904 and C 906 are mapped to a core 202-1 of one DPE, and the kernels represented by nodes D 908 and E 910 are mapped to a core 202-3 of another DPE.

At step 1110, the DPE array compiler 604 maps data structures defined in the kernel code onto local memory banks in the corresponding DPEs 110 or to DMA for non-local communication. As described above, DPEs in proximity with each other can share memory banks. Communication through shared memory can be single buffered or double buffered as described further herein. However, in some cases, a DPE may be far enough from another DPE such that the kernels executing thereon require DMA communication. As shown in FIG. 9C, communication between nodes A 902 and B 904 is through a double buffer 914; communication between the node B 904 and the node C 906 is through a single buffer 916; communication between the node C 906 and the node D 908 is through a double buffer 918; communication between the node D 908 and the node E 910 is through a single buffer 920; communication between the node E 910 and the node B 904 is through a double buffer 922; and communication between the node D 908 and the node F 912 is through a double buffer 924. As shown in FIG. 10, the buffer 914 is mapped to RAM banks 318 in a memory module 351-1. The buffer 918 is mapped to RAM banks 318 in a memory module 351-2. The buffer 924 is mapped to RAM banks 318 in the memory module 351-4. The memory buffers 916, 920, and 922 are mapped to the RAM banks 318 in the memory module 351-3.

In one example, a double buffer is a ping-pong buffer. A ping-pong buffer includes a ping buffer and a pong buffer. The ping buffer may be the same size as the pong buffer. Further, the ping buffer and the pong buffer may be mapped to the same memory group. In one or more examples, the ping buffer and the pong buffer are laced on different memory banks. Accordingly, the ping buffer and the pong buffer can operate in parallel with each other.

At step 1112, the DPE array compiler 604 allocates communication channels between the DPE array 105 and the PL 122. For example, communication channels to input/output circuitry configured in the PL 122 (e.g., compute nodes a and f). For example, as shown in FIG. 10, node A 902 is configured for DMA communication with DMA 220 in the memory module 351-1. Node F 912 is configured for DMA communication with DMA 220 in the memory module 351-4.

At step 1114, the DPE array compiler 604 allocates locks for core-to-core and core-to-DMA (if necessary) synchronization among the kernels. As shown in FIG. 9D, the DPE array compiler 604 allocates locks 930 between the nodes A 902 and B 904; locks 928 between the nodes C 906 and D 908; locks 926 between the nodes E 910 and B 904; and locks 930 between the nodes D 908 and F 912. The locks 926, 928, 930, and 932 provide for synchronization of the double buffers between nodes. The double buffers may be ping-pong buffers.

At step 1116, the DPE array compiler 604 routes the stream data communication between cores and to/from the PL 122 via stream switches (e.g., circuit-switched and/or packet-switched). In one example, the DPE array compiler determines whether or not first-in-first-out buffers (FIFOs) are to be inserted along stream routes and the size of the FIFOs.

At step 1118, the DPE array compiler 604 generates wrapper code for each DPE 110 and compiles the wrapper code to generate DPE binaries. At step 1120, the DPE array compiler 604 generates control code to configure the DMAs stream switches. The DPE array compiler 604 generates the control code from the code generated for each DPE. At step 1122, the DPE array compiler 604 generates application programming interfaces (APIs) for the control software executing on the processing system to access and control the kernels executing in the DPE array. For example, the DPE array compiler 604 uses the control code to generate APIs. The APIs are used to configure the DPEs 110 of the DPE array 105.

FIG. 12 illustrates a flowchart of a method 1200 for scheduling locks and buffers, according to one or more examples. In one example, the method 1200 is performed as part of step 1118 of the method 1100 of FIG. 11. For example, the DPE array compiler 604 performs the method 1200 as part of generating wrapper code for each DPE 110, and compiling the wrapper code to generate DPE binaries. In one or more examples, one or more processors (e.g., CPU 502) of the array compiler 604 of the design tool 510 executes instructions stored within a memory (e.g., the storage 520 or system memory 508) to perform the method 1200.

Figure 13:
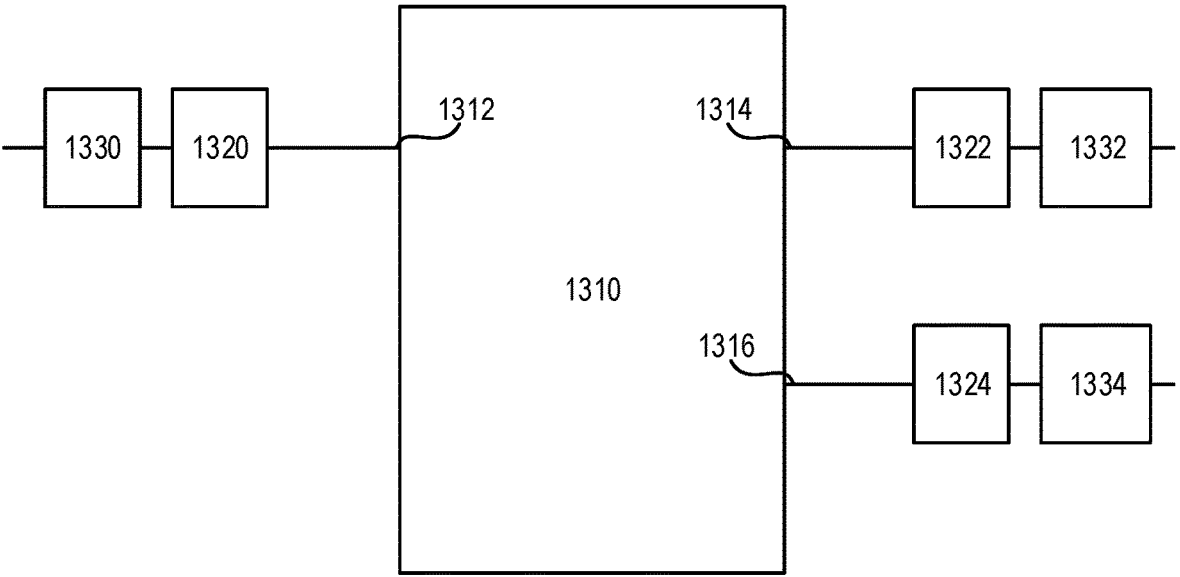
FIG. 13 illustrates a block diagram of a kernel and associated locks and buffers, according to one or more examples.

At step 1210 of FIG. 12, locks associated with one or more kernels are initiated. For example, FIG. 13 illustrates the kernel 1310. In one example, the DPE array compiler 604 initiates the locks 1320, 1322, and 1324. The lock 1320 is initiated with regard to the input pin 1312 of the kernel 1310, the lock 1322 is initiated with regard to the output pin 1314, and the lock 1324 is initiated with regard to the output pin 1316. The following code illustrates an example that may be used to initiate locks associated with the kernel i26.

```
int lockid_i26_pi2 = Lock 2 2_2_1184;
int lockid_i26_po0 = Lock_3_2_0_0;
int lockid_i26_po1 = Lock_3_3_0_3072;
```

In one or more examples, the process of step 1210 of FIG. 12 is applied to multiple kernels and respective locks.

At step 1220 of FIG. 12, buffers associated with data streams for the one or more kernels are initialized. For example, with reference to FIG. 13, the buffers 1330, 1332, and 1334 are initialized by the DPE array compiler 604. The buffer 1330 communicates to the kernel 1310 via the lock 1320. The buffer 1332 communicates with the kernel 1320 via the lock 1322. The buffer 1334 communicates with the kernel 1310 via the lock 1324. The buffers 1330, 1332, and 1334 may be double buffers (e.g., ping-pong buffers).

The buffer 1334 is associated with an input data stream (input windows), and the buffers 1332 and 1334 are associated with respective output data streams (output windows). While three buffers 1332, 1334, and 1336 are illustrated in FIG. 13, in other examples, the number of buffers may be greater than or less than three. Further, in one or more examples, the number of input buffers (e.g., buffers connected to an input pin) is greater than one. In one example, the number of output buffers (e.g., buffers connected to an output pin) is less than or greater than two. The following code illustrates an example that may be used to initiate buffers associated with the data streams of the kernel 1310.

```
input_window_cint16*input_window_i26_pi2=
(get_input_window_cint16(window_buf23_buf23d));
    output_window_cint16*output_window_i26_po0=
(get_output_window_cint16(window_buf25_buf25d));
    output_window_cint16*output_window_i26_po1=
(get_output_window_cint16(window_buf24_buf24d));
```

In one or more examples, the process of step 1220 of FIG. 12 is applied to multiple kernels and respective buffers.

At step 1230 of FIG. 12, the one or more kernels are simulated to generate samples based on the data streams. For example, with reference to FIG. 13, each instance of the kernel 1310 is simulated based on the data streams 1340, 1342, and 1344 by a DPE array compiler (e.g., the DPE array compiler 604 of FIG. 6). In one example, a kernel is simulated in multiple cores with multiple interactions using data samples using atomic operations. Atomic operations are operations that run independently from other processes. Each instance of the kernel is simulated during a simulation period (e.g., simulation time). In one example, a while (or bound) loop is used to obtain the samples to be output by the kernel. The following code illustrates an example that may be used to simulate the instances of a kernel.

```
int32 index = 1;
while(true)
{
    int32 proc_3_2_bounds = sync_buffer[1];
    while (proc_3_2_bounds)
{
```

In one or more examples, the process of step 1230 of FIG. 12 is applied to multiple kernels.

At step 1240 of the method 1200, the locks associated with the kernel are acquired. In one example, a kernel call function is performed to acquire the locks. For example, with reference to FIG. 13, the locks 1320, 1322, and 1334 associated with the kernel 1310 are acquired by a DPE array compiler (e.g., the DPE array compiler 604 of FIG. 6). In one example, acquiring the locks includes setting up the locks to be read or write locks. Read locks receive data from a corresponding buffer and provide the data to a kernel. Write locks write data from a kernel to a corresponding buffer. In one example, the lock 1320 is acquired and set as a read lock, and the locks 1322 and 1324 are acquired and set as write locks. In one or more examples, the step 1240 occurs subsequent to the steps 1220 and 1230. The following code illustrates an example that may be used to simulate the instances of a kernel.

```
// Kernel call : i26:pccfr_scale_add_middle_itr
acquire(lockid_i26_pi2, ACQ_READ);
acquire(lockid_i26_po0, ACQ_WRITE);
acquire(lockid_i26_po1, ACQ_WRITE);
```

In one or more examples, the process of step 1240 of FIG. 12 is applied to multiple kernels and respective locks.

At step 1250 of the method 1200, the kernel is executed. In one example, when executing the kernel input one or more data streams are received via one or more input ports and one or more data streams are output via one or more output ports. For example, with reference to FIG. 13, executing the kernel 1310 includes receiving a data stream via the input port 1312 and outputting a data stream via the output ports 1314 and 1316. Kernels mapped to each core of a DPE array are executed in a multi-core fashion guarded with locks for each buffer. In subsequent iterations, the data associated with the kernels alternate between ping and pong buffers (e.g., from a first to second buffer of a double buffer). In an example where an output port does not connect to a compute node, the corresponding write port is not advanced. Further, in an example where an output port uses two buffers, the writes take place at the same position due to DMA, and the write pointer is not advanced. In one or more examples, the step 1250 occurs subsequent to the step 1240. The following code illustrates an example that may be used to execute a kernel.

```
pccfr_scale_add_middle_itr(&stream_0,&stream_1,
(input_window_i26_pi2),
(output_window_i26_po0),(output_window_i26_po1));
```

In one or more examples, the process of step 1250 of FIG. 12 is applied to multiple kernels, and each of the multiple kernels is executed.

At step 1260 of the method 1200, data is copied from between buffers on an input port of the kernel. In one example, data is copied between ping and pong buffers of a double buffer in alternative iteration of the corresponding loop. In one or more examples, a buffer connected to an input port is a double buffer (e.g., a ping-pong buffer). In such an example, data is copied and communicated from a first buffer to a second buffer of the double buffer. With reference to FIG. 13, the buffer 1332 is a double buffer, and data is copied communicated between the buffers of the buffer 1332. The following code illustrates an example that may be used to perform a margin copy, copying data on an input port of a kernel.

window_margin_copy(window_buf23_buf23d,4448,
    buf23_ptr,buf23d_ptr,1-index);

In one or more examples, the process of step 1260 of FIG. 12 is applied to multiple kernels to copy data between the first buffer (e.g., ping buffers) and second buffers (e.g., pong buffers) of each of the kernels.

At step 1270 of the method 1200, the locks are released. In one or more examples, the locks associated with each kernel are released. In one example, with reference to FIG. 13, the locks 1320, 1322, and 1324 are released by a DPE array compiler (e.g., the DPE array compiler 604). Releasing the locks disassociates the locks from the kernel that had acquired the locks. After kernel execution, the locks are released from the corresponding buffers such that other cores can execute on the same buffer to perform an atomic operation. For example, the locks 1320, 1322, and 1324 are released and disassociated with the kernel 1310. The following code illustrates an example that may be used to release locks.

In one or more examples, step 1270 further includes adjusting the buffers associated with a kernel. In one or more examples, the buffer associated with each kernel are adjusted. In one or more examples, with reference to FIG. 13, the buffers 1330, 1332, and 1334 are adjusted. In one example, the buffers 1330, 1332, and 1334 are double buffers (e.g., ping pong buffers). In such an example, each of the buffers 1330, 1332, and 1334 is associated with two respective banks within a memory. Accordingly, during a first iteration, the buffers 1330, 1332, and 1334 utilize a first bank, and in a second iteration, the buffers 1330, 1332, and 1334 utilize a second bank. Adjusting the buffers includes pointing a buffer to the unused memory bank. For example, the buffers 1330, 1332, and 1334 are switched from using a first respective memory bank to a second respective memory bank when adjusting the buffers. In one or more examples, multiple kernels are mapped to a single core (e.g., 202 of FIG. 2). In such an example, there are multiple double buffers for the core and map the core to locations within a corresponding memory. The following code illustrates an example that may be used adjust the buffers.

```
release(lockid_i26_pi2,REL_WRITE);
release(lockid_i26_po0, REL_READ);
release(lockid_i26_po1, REL_READ);
lockid_i26_pi2 = index ? LOCK_2_2_3_0: LOCK_2_2_2_1184;
adjustPingPongBuffer(window_buf23_buf23d,buf23_ptr,
buf23d_ptr,0,index);
input_window_i26_pi2->ptr = window_buf23_buf23d->head;
lockid_i26_po0 = index ? LOCK_3_2_1_0: LOCK_3_2_0_0;
adjustPingPongBuffer(window_buf25_buf25d,buf25_ptr,buf25d_ptr,
4288,index);
output_window_i26_po0->ptr = window_buf25_buf25d->head;
lockid_i26_po1 = index ? LOCK_3_3_1_2560: LOCK_3_3_0_3072;
adjustPingPongBuffer(window_buf24_buf24d,buf24_ptr,
buf24d_ptr,0,index);
output_window_i26_po1->ptr = window_buf24_buf24d->head;
index = 1 - index;
if(proc_3_2_bounds > 0)
--proc_3_2_bounds;
}
```

In one example, for each of the kernels, the locks are released and the buffers are adjusted at 1270 for a number of iterations. At the completion of the number of iterations, the method 1200 ends, and the method 1100 continues to step 1120. In one or more examples, the step 1270 occurs subsequent to the steps 1210-1260.

As is illustrated in FIG. 12, the locks and buffers are initiated before a kernel call is performed. Further, the buffers (e.g., the ping-pong buffers) are adjusted after the kernel is executed. Accordingly, the lock and buffer scheduling for a multi-core architecture is improved as compared to other processes.

In the above, techniques for compiling kernels of an application to DPEs of a DPE array of an IC device. The compiling process includes producing execution binaries and configuration code associated with each kernel to be loaded and used to configure the DPEs. The compiling process includes mapping the data structures used by the kernels to the memories of the DPEs. In such a process, locks and buffers are scheduled to control the communication of data streams into and out of a kernel. As is described above, the locks and buffers are initialized before a kernel call is performed. Further, the buffers are adjusted, switching between the ping buffer and pong buffer of the buffers after the kernel is executed. Accordingly, when mapped to DPEs of an IC device having a multi-core architecture, the reading and writing of data is improved, improving the performance of the IC device.

While the foregoing is directed to specific examples, other and further examples may be devised without departing from the basic scope thereof, and the scope thereof is determined by the claims that follow.

What is claimed is:

1. A method comprising:

mapping, based on graph representation of an application, kernels of the application onto data processing engines (DPEs) of a DPE array;

generating main code for cores of the DPEs, wherein generating the main code includes:

initializing locks for each kernel associated with the cores the DPEs, each of the locks is associated with a respective input port or output port of a respective one of the kernels;

initializing buffers for the kernels, each of the buffers is associated with a respective lock of the locks and a data stream of data streams;

executing, subsequent to initializing the locks and initializing the buffers, the kernels to generate data samples from the data streams;

releasing, subsequent to executing the kernels, the locks associated with the kernels for subsequent calls of the kernels for the cores;

adjusting, subsequent to executing the kernels and releasing the locks, the buffers to point one or more of the buffers to an unused memory bank of a memory; and implementing one or more of the kernels in each of the cores of the DPEs; and generating control code to configure direct memory access (DMA) and switch circuitry in the DPE array based on data associated with each of the kernels.

2. The method of claim 1, wherein the buffers include ping buffers and pong buffers, and wherein adjusting the buffers further includes adjusting between the ping buffers and the pong buffers in a subsequent iteration.

3. The method of claim 2 further comprising copying data between the ping buffers and the pong buffers.

4. The method of claim 1 further comprising simulating the kernels to generate samples from the data streams.

5. The method of claim 1, wherein each input port of each of the kernels is associated with a respective buffer of the buffers and each output port of each of the kernels is associated with a respective buffer of the buffers.

6. The method of claim 1, wherein each of the buffers is associated with two respective memory banks of the memory, and adjusting the buffers to point the one or more of the buffers to the unused memory bank of a memory comprises adjusting a first buffer of the buffers to point from a first memory bank during a first iteration to a second memory bank during a second iteration.

7. A non-transitory computer readable medium having stored thereon instructions that when executed by a processor cause the processor to:

map, based on a graph representation of an application, kernels of the application onto cores of data processing engines (DPEs) of a DPE array; and generate main code for the cores of the DPEs, wherein generating the main code includes:

initializing locks for the kernels, each of the locks is associated with a respective input port or output port of a respective kernel of the kernels;

initializing buffers for the kernels, each of the buffers is associated with a respective lock of the locks and a data stream of data streams;

executing, subsequent to initializing the locks and initializing the buffers, one or more of the kernels having an external input to generate data samples from the data streams;

releasing, subsequent to executing the kernels, the locks associated with the kernels;

adjusting, subsequent to executing the kernels and releasing the locks, the buffers to point one or more of the buffers to an unused memory bank of a memory; and implementing the one or more of the kernels in each of the cores of the DPEs;

generating control code to configure direct memory access (DMA) and switch circuitry in the DPE array based on data associated with each of the kernels.

8. The non-transitory computer readable medium of claim 7, wherein the buffers include ping buffers and pong buffers, and wherein adjusting the buffers includes adjusting between the ping buffers and the pong buffers in a subsequent iteration.

9. The non-transitory computer readable medium of claim 8, wherein the processor is further caused to copy data between the ping buffers and the pong buffers.

10. The non-transitory computer readable medium of claim 7, wherein the processor is further caused to simulate the kernels to generate samples from the data streams.

11. The non-transitory computer readable medium of claim 7, wherein each input port of each of the kernels is associated with a respective buffer of the buffers and each output port of each of the kernels is associated with a respective buffer of the buffers.

12. The non-transitory computer readable medium of claim 7, wherein each of the buffers is associated with two respective memory banks of the memory, and adjusting the buffers to point the one or more of the buffers to the unused memory bank of a memory comprises adjusting a first buffer of the buffers to point from a first memory bank during a first iteration to a second memory bank during a second iteration.

13. A computer system comprising:

a memory configured to store program code; and a processor configured to execute the program code to:

map, based on a graph representation of an application, kernels of the application onto data processing engines (DPEs) of a DPE array; and generate main code for cores of the DPEs, wherein generating the main code includes:

initializing locks for each of the kernels associated with the cores the DPEs, each of the locks is associated with a respective input port or output port of a respective one of the kernels;

initializing buffers for the kernels, each of the buffers is associated with a respective lock of the locks and a data stream of data streams;

executing, subsequent to initializing the locks and initializing the buffers, the kernels to generate data samples from the data streams;

releasing, subsequent to executing the kernels, the locks associated with the kernels;

adjusting, subsequent to executing the kernels and releasing the locks, the buffers to point one or more of the buffers to an unused memory bank of a memory;

implementing one or more of the kernels in each of the cores of the DPEs; and generating control code to configure direct memory access (DMA) and switch circuitry in the DPE array based on data associated with each of the kernels.

14. The computer system of claim 13, wherein the buffers include ping buffers and pong buffers, and wherein adjusting the buffers includes adjusting between the ping buffers and the pong buffers in a subsequent iteration.

15. The computer system of claim 14, wherein the processor is further configured to copy data between the ping buffers and the pong buffers.

16. The computer system of claim 13, wherein the processor is further configured to simulate the kernels to generate samples from the data streams.

17. The computer system of claim 13, wherein each input port of each of the kernels is associated with a respective buffer of the buffers and each output port of each of the kernels is associated with a respective buffer of the buffers.

18. The computer system of claim 13, wherein each of the buffers is associated with two respective memory banks of the memory, and adjusting the buffers to point the one or more of the buffers to the unused memory bank of a memory comprises adjusting a first buffer of the buffers to point from a first memory bank during a first iteration to a second memory bank during a second iteration.

* * * * *